(12) United States Patent
Hanna et al.

(10) Patent No.: US 9,758,135 B2
(45) Date of Patent: Sep. 12, 2017

(54) FRICTION BRAKE COMPONENT AND METHOD FOR MANUFACTURING THE SAME

(71) Applicant: GM Global Technology Operations LLC, Detroit, MI (US)

(72) Inventors: Michael D. Hanna, West Bloomfield, MI (US); Michael L. Holly, St. Clair Shores, MI (US); Ronnie T. Brown, Bloomfield Hills, MI (US); James A. Webster, Shelby Township, MI (US); Lisa G. Devoe, Ortonville, MI (US); Donna Y. Sekulovski, Novi, MI (US); Kee Hyuk Im, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/539,371

(22) Filed: Nov. 12, 2014

(65) Prior Publication Data

US 2015/0096850 A1    Apr. 9, 2015

Related U.S. Application Data

(62) Division of application No. 12/793,525, filed on Jun. 3, 2010.

(51) Int. Cl.
*B60T 1/06*    (2006.01)
*F16D 65/10*    (2006.01)
*F16D 65/12*    (2006.01)

(52) U.S. Cl.
CPC .............. *B60T 1/065* (2013.01); *F16D 65/10* (2013.01); *F16D 65/12* (2013.01); *F16D 2200/0013* (2013.01); *F16D 2200/0017* (2013.01); *F16D 2200/0021* (2013.01); *F16D 2250/0038* (2013.01)

(58) Field of Classification Search
CPC ...... F16D 65/12; F16D 65/125; F16D 65/127; F16D 2065/13; F16D 2065/132
USPC ..... 188/18 A, 218 XL, 218 R; 148/217, 218, 148/318
See application file for complete search history.

(56) References Cited

U.S. PATENT DOCUMENTS

| | | | | |
|---|---|---|---|---|
| 2,178,527 | A * | 10/1939 | Wellman | F16D 69/027 188/251 R |
| 2,408,430 | A * | 10/1946 | Lowey | F16D 69/027 106/36 |
| 9,541,144 | B2 * | 1/2017 | Sugai | C23C 8/30 |
| 9,581,211 | B2 * | 2/2017 | Holly | C23C 8/04 |
| 2008/0000550 | A1 * | 1/2008 | Holly et al. | 148/217 |
| 2009/0223275 | A1 * | 9/2009 | Hanna | B21D 37/01 72/470 |

* cited by examiner

*Primary Examiner* — Thomas Irvin
(74) *Attorney, Agent, or Firm* — BrooksGroup

(57) ABSTRACT

A ferritically nitrocarburized rotational member of a vehicle brake is disclosed, including a rotational member having a friction surface configured for braking engagement with a corresponding friction material. A compound zone is disposed at the friction surface. An exposed surface of the compound zone is exposed to an atmosphere. The area of the exposed surface includes from about 0 percent to about 14 percent graphite.

3 Claims, 4 Drawing Sheets

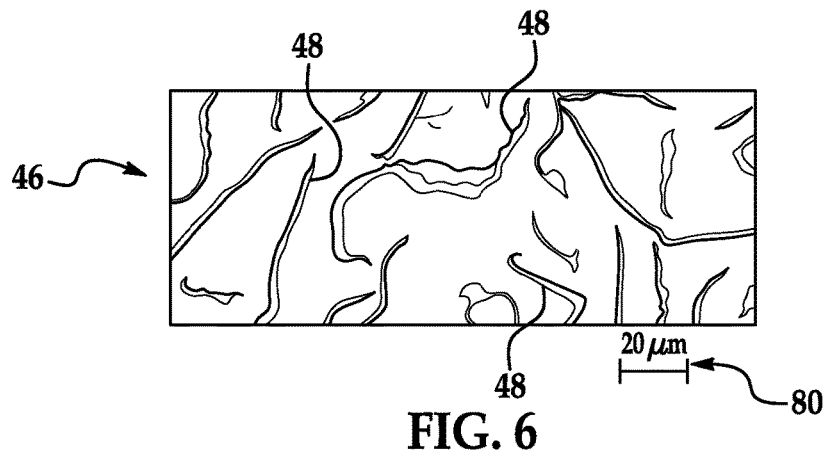
FIG. 6
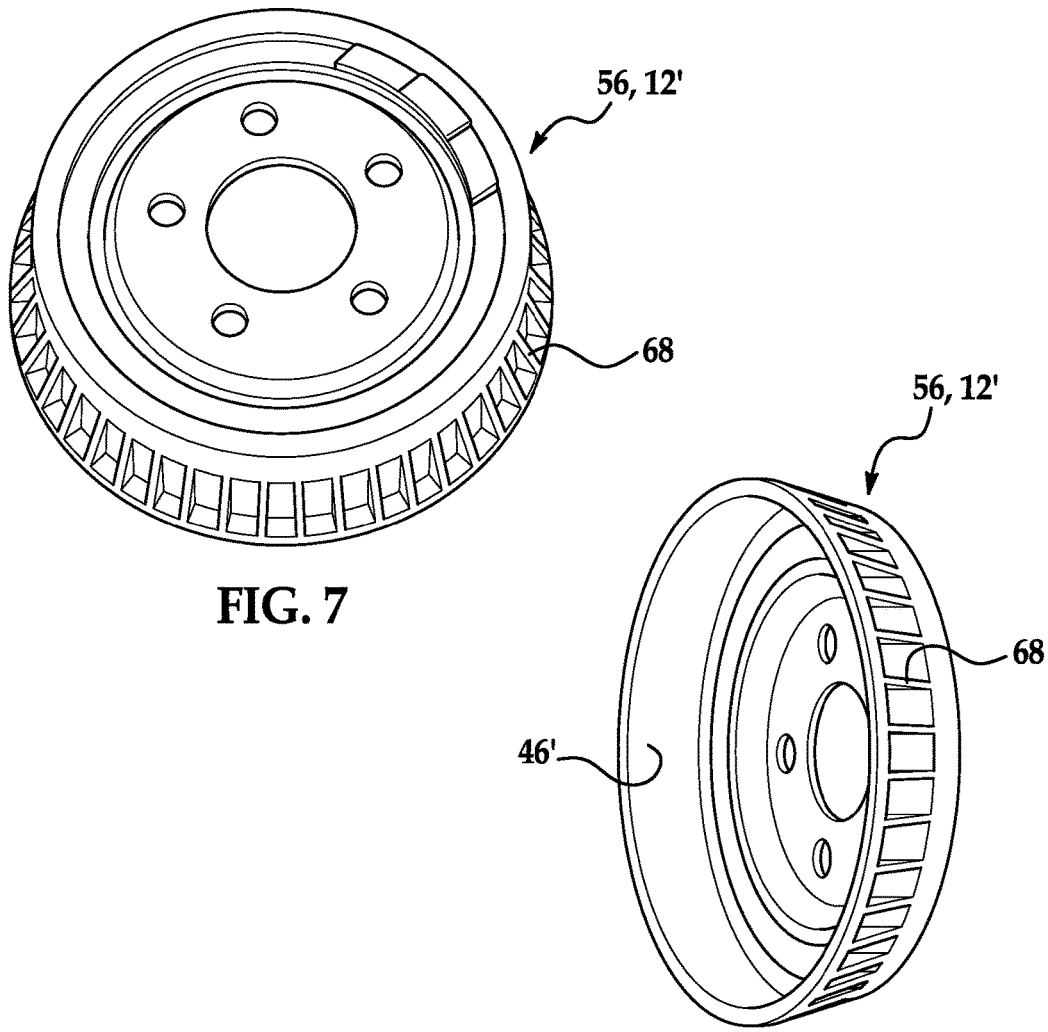
FIG. 7
FIG. 8

FRICTION BRAKE COMPONENT AND METHOD FOR MANUFACTURING THE SAME

This application is a divisional of U.S. application Ser. No. 12/793,525 filed Jun. 3, 2010.

TECHNICAL FIELD

The present disclosure relates generally to a friction brake component and method of manufacturing.

BACKGROUND

Friction brake components, such as, e.g., brake rotors and brake drums may be used in a vehicle brake system. It may be desirable for a brake rotor or brake drum to have a high coefficient of friction with a friction material while promoting long life of the friction material and the brake rotor or brake drum.

SUMMARY

A ferritically nitrocarburized rotational member of a vehicle brake has a rotational member, including a friction surface configured for braking engagement with a corresponding friction material. A compound zone is disposed at the friction surface. The compound zone may have a surface that is exposed to an atmosphere. The area of the exposed surface includes from about 0 percent to about 14 percent graphite.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 6 is a microscopic enlargement of a surface of the brake disc shown in FIG. 5;

FIG. 7 is a perspective view of a brake drum in an example of the present disclosure;

FIG. 8 is a perspective view showing the inside of the brake drum depicted in FIG. 7;

DETAILED DESCRIPTION

A brake 10 is an energy conversion system used to retard, stop, or hold a vehicle. While a vehicle in general may include spacecraft, aircraft, and ground vehicles, in this disclosure, a brake 10 is used to retard, stop, or hold a wheeled vehicle with respect to the ground. More specifically, as disclosed herein, a brake 10 is configured to retard, stop, or hold at least one wheel of a wheeled vehicle. The ground may be improved by paving.

Figure 1:
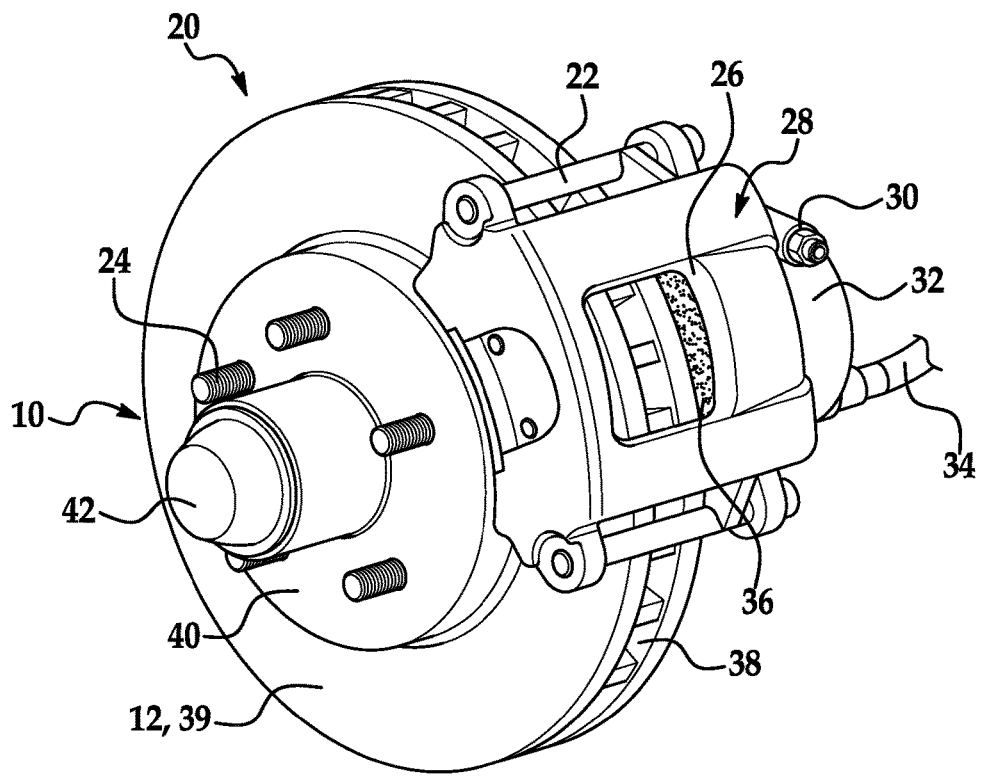
FIG. 1 is a perspective view of a disc brake assembly in an example of the present disclosure.

A vehicle brake 10 may be a disc brake 20, drum brake 50, and combinations thereof. FIG. 1 depicts an example of a vehicle brake, in particular, a disc brake 20. In a disc brake 20, a rotational member 12 is typically removably attached to a wheel (not shown) at a wheel hub 40 by a plurality of wheel studs 24 cooperatively engaged with lug nuts (not shown). The rotational member 12 in a disc brake 20 may be known as a brake disc (or rotor) 39. The rotor 39 may include vent slots 38 to improve cooling and increase the stiffness of the brake disc 39. When hydraulic fluid is pressurized in a brake hose 34, a piston (not shown) inside a piston housing 32 of a caliper 28, causes the caliper 28 to squeeze the brake disc 39 between brake pads 36, thereby engaging the disc brake 20. The brake pads 36 may include a friction material 44 that contacts a friction surface 46 of the brake disc 39 when the disc brake 20 is engaged. If the wheel is rotating at the time the disc brake 20 is engaged, kinetic energy of the moving vehicle is converted to heat by friction between the brake pads 36 and the brake disc 39. Some of the heat energy may temporarily raise the temperature of the brake disc 39, but over time, the heat is dissipated to the atmosphere surrounding the vehicle.

Figure 2:
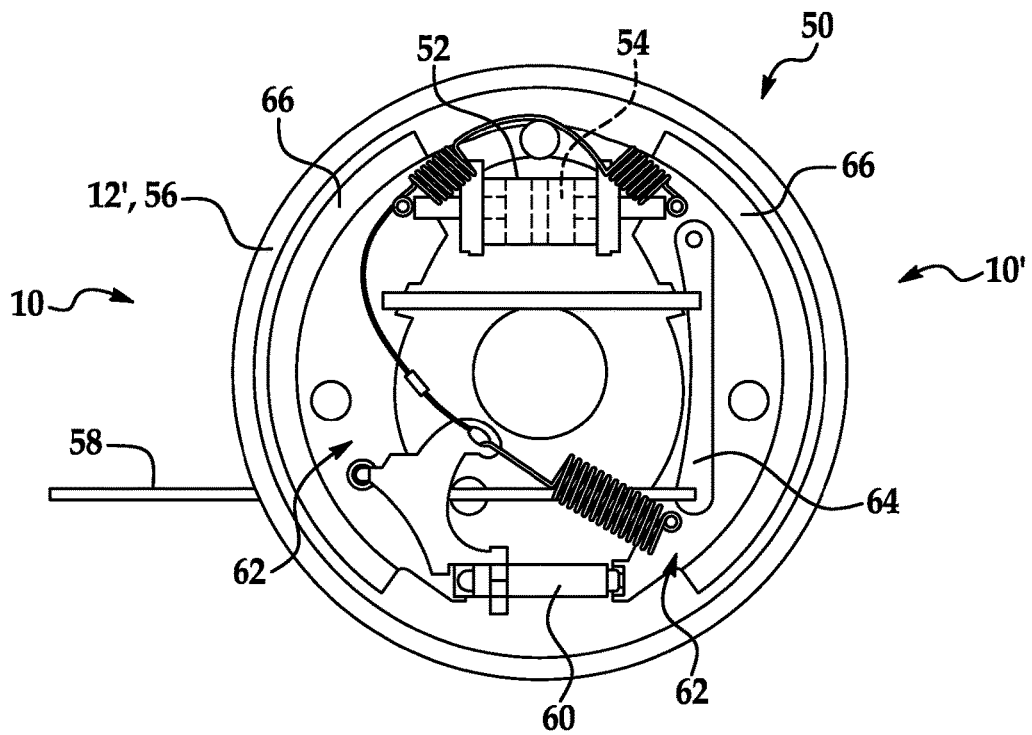
FIG. 2 is a side view of a drum brake assembly in an example of the present disclosure.

Referring now to FIG. 2, a drum brake 50 in an example is shown. The rotational member 12' is a brake drum 56 (see also FIGS. 7 and 8). The brake drum 56 is removably fastened to a wheel (not shown). The brake drum 56 may include fins 68 to improve cooling and increase the stiffness of the brake drum 50. When hydraulic fluid is pressurized in a wheel cylinder 52, a piston 54 causes the brake shoes 62 to press a brake lining 66 against the brake drum 56, thereby engaging the drum brake 20. It is to be understood that the brake lining 66 is a friction material 44'. Alternatively, a drum brake 56 may be engaged mechanically by actuating an emergency brake lever 64 via an emergency brake cable 58. The emergency brake lever 64 causes the shoes 62 to press the brake lining 66 against the brake drum 56. If the wheel is rotating at the time the drum brake 50 is engaged, kinetic energy of the moving vehicle is converted to heat by friction between the brake lining 66 and the brake drum 56. Some of the heat energy may temporarily raise the temperature of the brake drum 56, but over time, the heat is dissipated to the atmosphere surrounding the vehicle.

FIG. 7 shows a perspective view of a brake drum 56 in an example of a rotational member 12'. FIG. 8 is a rotated perspective view of the brake drum 56 shown in FIG. 7, showing an inside view of the brake drum 56. The friction surface 46' is visible in FIG. 8. As shown in both FIGS. 7 and 8, examples of a brake drum 56 may include fins 68.

Figure 9:
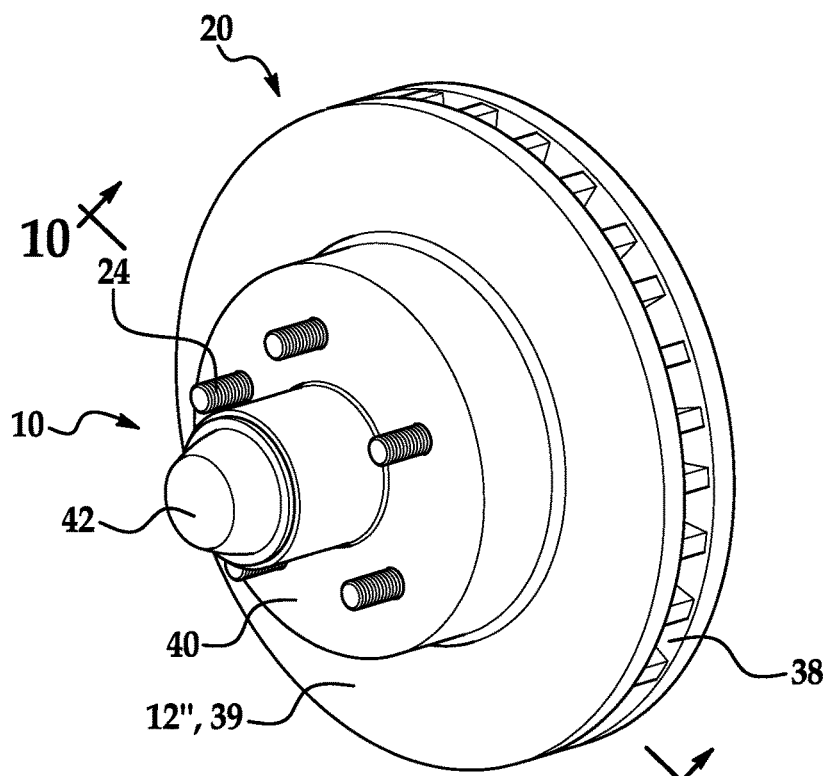
FIG. 9 is a perspective view of a drum-in-hat rotational member.
Figure 10:
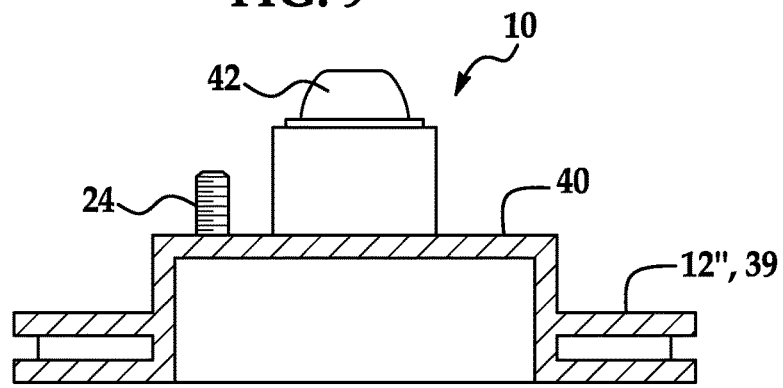
FIG. 10 is a cross sectional view of the drum-in-hat rotational member depicted in FIG. 9.

It is to be understood that a disc brake 20 may be combined with a drum brake 50. As shown in FIGS. 9 and 10, a drum-in-hat rotational member 12" may be included in such a combination. In a drum-in-hat type brake, small brake shoes may be mechanically/cable actuated as an emergency brake, while the flange portion acts as a typical disc brake.

The rotational member 12, 12', 12" includes a friction surface that is engaged by a friction material 44, 44' of the brake pad 36 or the brake shoe 62. As a brake is engaged to retard a vehicle, mechanical wear and heat may cause small amounts of both the friction material 44, 44' and the rotational member 12, 12', 12" to wear away. It may be possible to reduce the rate of wear of the rotational member 12, 12', 12" or the friction material 44, 44' by reducing the coefficient of friction between the two, but a lower coefficient of friction may make the brake 10 less effective at retarding the vehicle.

In the production of a gray cast iron brake disc 39 or drum 56, graphite flakes may be embedded in the cast iron at the friction surface 46, 46'. Gray iron is a cast iron in which free graphite, in the form of flakes, precipitates throughout a metallic matrix. It is the graphite flakes which account for the excellent machinability, wear resistance, damping capacity, low shrinkage characteristics during solidification, and generally higher thermal conductivity of gray cast iron during operation. Due to galvanic scale differences between graphite and the metal matrix in which it is embedded, the graphite flakes may be initiation sites for corrosion of the cast iron, leading to pitting and roughness. In cast iron, corrosion is mainly the formation of iron oxides. Iron oxides are very hard and abrasive. Thus, corrosion may lead to undesirably rapid wear of the friction surface 46, 46' and the corresponding friction material 44, 44'. Graphite flakes may act as tiny masks during ferritic nitrocarburization. Thus, if graphite flakes are dislodged during brake use, they leave a small crevice which has not been ferritically nitrocarburized and may act as an initiation site for corrosion.

It is to be understood that graphite generally has high lubricity when interposed between sliding surfaces. Furthermore, the lubricity of graphite may reduce the coefficient of friction between the friction material 44, 44' and the friction surface 46, 46' during brake engagement, at least until corrosion begins.

Ferritic nitrocarburization has been used to produce a friction surface 46, 46' that resists corrosion and wear. Ferritic nitrocarburization may be used to dispose a compound zone 70 on the rotational member 12, 12', 12" of the brake 10. In an example, a rotational member 12, 12', 12" has a compound zone 70 disposed at the friction surface 46, 46'. The compound zone 70 may have an exposed surface in contact with an atmosphere, for example, air.

It is to be understood that a gray cast iron normally includes flakes of graphite. However, in an example, the rotational member 12, 12', 12" has an exposed surface of the compound zone 70 having from about 0 percent to about 14 percent graphite. In another example, the exposed surface may include from about 1 percent to about 10 percent graphite. In yet another example, the exposed surface may include from about 2 percent to about 5 percent graphite. Still further, an example may have an exposed surface including from about 3 percent to about 14 percent graphite. The percentage of graphite is the ratio of the area of the exposed surface that is graphite to the total area of the exposed surface expressed as a percentage. A sample calculation is as follows:

(area of graphite: 11.78 in$^2$)/(total area of exposed surface: 117.8 in$^2$)*100=10%

Figure 4:
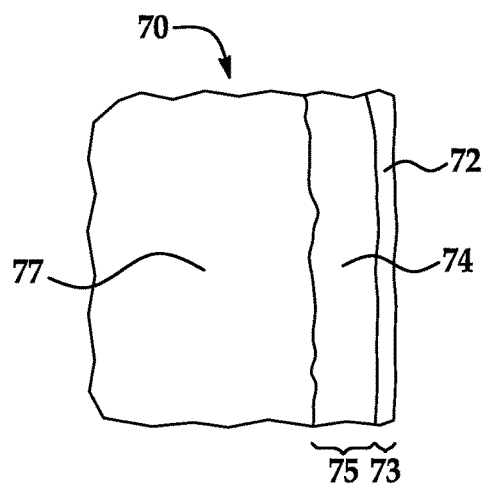
FIG. 4 is a schematic depiction of a section view showing a compound layer in an example of the present disclosure at a microscopic enlargement.

As depicted in FIG. 4, the compound zone 70 further may include an oxide layer 72 having $Fe_3O_4$ disposed at the exposed surface. An iron nitride layer 74 including epsilon $Fe_3N$ iron nitride and gamma prime $Fe_4N$ iron nitride may be generally subjacent the oxide layer 72 and containing a majority of epsilon $Fe_3N$ iron nitride. Further, the oxide layer 72 may have a thickness 73 ranging from about 5% to about 50% of a thickness 75 of the iron nitride layer 74. As shown in FIG. 4, a diffusion layer 77 is subjacent the iron nitride layer 74 and is a transition between the iron nitride layer 74 and a portion of the rotational member that is beyond the reach of ferritic nitrocarburization (not shown).

Figure 3:
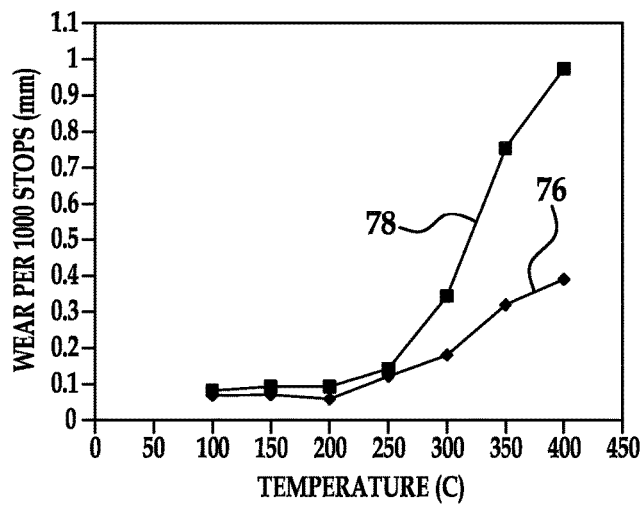
FIG. 3 is a graph comparing experimental wear vs. temperature results for an example of the present disclosure and a prior art brake.

FIG. 3 is a graph comparing experimental wear vs. temperature results for an example and a prior art brake. The improved wear-vs.-temperature curve 76 for a friction material against a low graphite concentration friction surface is shown compared to the wear-vs-temperature curve 78 against a standard friction surface. In an example, a ferritically nitrocarburized rotational member 12, 12', 12" with low graphite concentration at the friction surface 46, 46' exhibits a friction material 44, 44' wear of less than 0.4 mm per 1000 stops at about 350° C. An experiment using the test procedure in Surface Vehicle Recommended Practice J2707, Issued February 2005 by SAE International gave the results shown at 76 in FIG. 3. An Akebono NS265 Non Asbestos Organic (NAO) friction material was used in the experiment.

Figure 5:
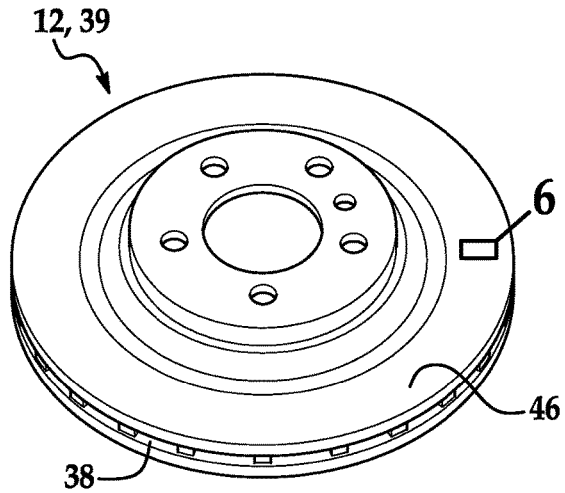
FIG. 5 is a perspective view of a brake disc in an example of the present disclosure.

Referring now to FIG. 5, a perspective view of a brake disc 39 in an example is shown. Rotational member 12 is a brake disc 39 with vent slots 38. FIG. 6 is a depiction of a microscopic enlargement of a friction surface 46 of the brake disc 39 shown in FIG. 5. In the example shown in FIG. 6, microscopic crevices 48 are present in the friction surface 46. A scale indicator 80 is provided in FIG. 6 to facilitate estimation of the size of crevices 48 and their relative density on a friction surface 46. It is noted that graphite flakes (not shown) are substantially absent according to an example of the present disclosure.

The rotational member 12, 12', 12" may be made from gray cast iron, steel, or stainless steel. It is to be understood that the rotational member may be cast, stamped, forged, formed from powdered metal or any suitable forming process. The compound zone 70 disposed at the friction surface 46, 46' may exhibit a hardness of between about 56 HRC and about 64 HRC. Alternatively, the compound zone 70 may exhibit a hardness on gray cast iron of at least 300 HK100 per SAE AMS2757b or SAE AMS2753. Hardness is directly related to wear resistance.

Figure 11:
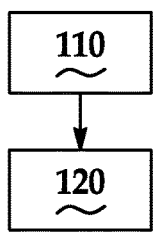
FIG. 11 is a flow diagram depicting an example of a method according to the present disclosure.

A method 100 for increasing useful life of a rotational member 12, 12', 12" of a vehicle brake 10 is disclosed herein and shown schematically in FIG. 11. The method 100 includes step 110, removing graphite flakes from a friction surface 46, 46' of the rotational member 12, 12', 12" prior to step 120, nitrocarburizing the friction surface 46, 46'. The graphite flakes may be removed by, for example, sand blasting, grit blasting, grinding, and combinations thereof. After the graphite has been removed according to examples of the method 100, graphite will comprise less than about 14 percent of the friction surface 46, 46'. In an example, the friction surface 46, 46' may include from about 1 percent to about 5 percent graphite. In yet another example, the friction surface 46, 46' may include from about 2 percent to about 10 percent graphite. Still further, an example may have a friction surface 46, 46' including from about 3 percent to about 14 percent graphite. The percentage of graphite is the ratio of the area of the friction surface 46, 46' that is graphite to the total area of the friction surface 46, 46' expressed as a percentage. A sample calculation is as follows:

(area of graphite: 11.78 in$^2$)/(total area of friction surface: 117.8 in$^2$)*100=10%

After the graphite has been removed according to the method 100, at least the friction surface 46, 46' of the rotational member 12, 12', 12" is nitrocarburized. It is to be understood that removal of the graphite before nitrocarburizing prevents the graphite from masking tiny areas from nitrocarburization. If nitrocarburization is performed before removing graphite flakes, the tiny areas masked by the graphite flakes may act as initiation sites for corrosion.

It is to be understood that nitrocarburizing includes a gas nitrocarburizing process, plasma nitrocarburizing process, or salt bath nitrocarburizing process. The salt bath nitrocarburizing process may include immersing at least the friction surface 46, 46' of the rotational member 12, 12', 12" into a nitrocarburizing salt bath, and then immersing at least the friction surface 46, 46' of the rotational member 12, 12', 12" into an oxidizing salt bath.

The rotational member 12, 12', 12" may be formed from gray cast iron using the method 100 above. It is to be understood that the rotational member 12, 12', 12" may include a brake disc 39, a brake drum 50, or a combination thereof. The rotational member 12, 12', 12" formed using the disclosed method 100 may reduce the wear in a corresponding friction material 44, 44'. For example, the friction material 44, 44' used with the rotational member 12, 12', 12" formed using the disclosed method 100 may exhibit wear of less than 0.4 mm per 1000 stops at 350° C. The compound zone 70 disposed at the friction surface 46, 46' may exhibit a hardness between about 56 HRC and about 64 HRC. Alternatively, the compound zone 70 may exhibit a hardness on gray cast iron of at least 300 HK100 per SAE AMS2757b or SAE AMS2753. Wear resistance of the compound zone is directly related to hardness. It is to be understood that friction material 12, 12', 12" wear may be determined using Surface Vehicle Recommended Practice J2707, Issued February 2005 by SAE International.

The rotational member 12, 12', 12" formed using the method 100 disclosed above may exhibit a coefficient of friction of at least 0.32 between the friction surface 46, 46' and the corresponding friction material 44, 44'. In an experiment, a specimen of rotational member 12, 12', 12" material made according to the disclosed method was tested with an Akebono NS265 Non Asbestos Organic (NAO) brake pad. A 50 N normal load was applied, and the friction coefficient was determined by measuring a force in opposition to an oscillating sliding force applied at 2 Hz. The friction coefficient in the test was determined to be greater than 0.32 for at least 300 cycles. Further, the method 100 may improve corrosion resistance. Less than 15 percent of the exposed portion of the friction surface 46, 46' may exhibit visible red rust after 1 week in humid air with a temperature of at least about 10° C. (50° F.). It is to be understood that for the purposes of this disclosure, humid air has a relative humidity of greater than about 40 percent. The corrosion resistance depends on the amount of graphite that remains. If only 1 to 5 percent of the exposed area of the friction surface 46, 46' is graphite flakes, then the percentage of visible red rust would be in a lower part of the disclosed range.

Numerical data have been presented herein in a range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a surface area amount ranging from about 1% to about 10% should be interpreted to include not only the explicitly recited limits of about 1% to about 10%, but also to include individual amounts such as 2%, 3%, 4%, etc., and sub-ranges such as 5% to 8%, 3% to 9%, etc.

While several examples have been described in detail, it will be apparent to those skilled in the art that the disclosed examples may be modified. Therefore, the foregoing description is to be considered exemplary rather than limiting.

The invention claimed is:

1. A method of treating a brake rotor comprising using a gas nitrocarburizing process or a plasma nitrocarburizing process to produce a brake rotor comprising a compound zone extending from an outer surface of the brake rotor, the compound zone comprising an oxide layer having $Fe_3O_4$ disposed at an exposed surface of the brake rotor, and an iron nitride layer including epsilon $Fe_3N$ iron nitride and gamma prime $Fe_4N$ iron nitride generally subjacent the oxide layer wherein the exposed surface further comprises greater than 0 percent to about 14 percent graphite flakes, further comprising removing the graphite flakes from the exposed surface prior to the step of using a gas nitrocarburizing process or a plasma nitrocarburizing process to produce a brake rotor.

2. A method as set forth in claim 1 wherein the exposed surface further comprises graphite flakes greater than 0 percent to about 5 percent.

3. A method as set forth in claim 1 wherein the oxide layer has a thickness ranging from about 5% to about 50% of a thickness of the iron nitride layer.

* * * * *